United States Patent [19]
McAlinden

[11] Patent Number: 5,946,633
[45] Date of Patent: Aug. 31, 1999

[54] METHOD AND TERMINAL FOR HIGH BANDWIDTH CELLULAR DATA TRANSMISSION

[75] Inventor: Paul McAlinden, Austin, Tex.

[73] Assignee: Motorola Inc., Schaumburg, Ill.

[21] Appl. No.: 08/766,697

[22] Filed: Dec. 13, 1996

[51] Int. Cl.⁶ .............. H04Q 7/20; H04Q 7/32; H04Q 7/38
[52] U.S. Cl. .......... 455/551; 455/552; 455/550; 455/422; 455/418; 370/468; 370/477
[58] Field of Search ................. 455/551, 552, 455/406, 408, 418, 419, 557, 550, 466, 422, 447, 464; 370/341, 312, 467, 468, 477

[56] References Cited

U.S. PATENT DOCUMENTS

| | | | |
|---|---|---|---|
| 5,259,018 | 11/1993 | Grimmett et al. | 455/551 |
| 5,297,192 | 3/1994 | Gerszberg | 455/418 |
| 5,428,666 | 6/1995 | Fyfe et al. | 455/551 |
| 5,625,669 | 4/1997 | McGregor et al. | 455/406 |
| 5,722,084 | 2/1998 | Chakrin et al. | 455/418 |
| 5,761,618 | 6/1998 | Lynch et al. | 455/419 |

*Primary Examiner*—Wellington Chin
*Assistant Examiner*—Keith Ferguson

[57] ABSTRACT

A high bandwidth cellular data (HBCD) terminal (500) uses multiple transceivers (528, 534, 5450) and modems (520, 532, 538) to simultaneously establish multiple data links to an HBCD server (114) via a mobile central office (MCO 102). Data links are created on the voice bands of cellular channels associated with one or more secondary mobile identification numbers (MINs) assigned to that terminal as more bandwidth is required. A high bandwidth analog cellular communication protocol simultaneously uses the multiple data links to transmit data. The plurality of secondary MINs and simultaneous links allows increased bandwidth with minimal costs associated to the MCO.

30 Claims, 7 Drawing Sheets

METHOD AND TERMINAL FOR HIGH BANDWIDTH CELLULAR DATA TRANSMISSION

RELATED APPLICATIONS

The following applications are related to one another by subject matter: Apparatus and Method for Operating A Data Server, U.S. Ser. No. 08/766,696 and Method and Terminal for High Bandwidth Cellular Data Transmission, U.S. Ser. No. 08/766,697, filed concurrently.

FIELD OF THE INVENTION

The present invention generally relates to telecommunication systems and more specifically to analog cellular systems.

BACKGROUND OF THE INVENTION

Current telecommunication systems for cellular applications include analog and digital systems. Analog cellular systems, which currently dominate cellular transmission systems, use a variety of different protocols. Two known analog cellular data systems include a cellular modem system and a cellular digital packet data system ("CDPD", hereafter). Analog cellular data systems have a variety of problems including low bandwidth and costly hardware requirements.

With the cellular modem system, the main drawback of the system is its low throughput, typically in the range of 4800 to 9600 bits per second. Moreover, due to the noisy environment of the cellular modem system, achieving the maximum throughput of over 9000 bits per second is difficult. Another drawback of cellular modem systems is that they require a permanent connection between the base and the mobile system. This requirement increases the cost for the end user.

The main drawback with the CDPD system is the substantial system costs. The CDPD system is not restricted to a specific voice channel, and does not require a permanent connection, a dedicated channel, between the base and mobile system. However, the CDPD system requires that every base station has a hardware update to incorporate CDPD site functionality. This update substantially increases the investment in infrastructure costs for the cellular service provider.

Emerging and existing data communications applications require large bandwidths to exchange information. For instance, effective wireless access to the Internet, the World Wide Web, and other information systems requires the availability of large bandwidths. However, as has been described, current systems have unacceptably low bandwidths or require significant capital expenditures. Therefore, a need exists to increase the bandwidth of analog cellular systems without requiring costly new hardware installations to base stations or cell sites.

BRIEF DESCRIPTION OF THE DRAWINGS

The features and advantages of the present invention will be more clearly understood from the following detailed description taken in conjunction with the accompanying FIGURES where like numerals refer to like and corresponding parts and in which.

DETAILED DESCRIPTION OF THE PREFERRED EMBODIMENT

The present invention increases the bandwidth of a standard analog cellular network by assigning secondary voice channels corresponding to a plurality of secondary mobile identification numbers to a data link. The assignment of secondary voice channels may be static or may be dynamic and may be initiated by either side of the data link. A high bandwidth cellular data (HBCD, hereafter) terminal accesses these secondary voice data channels by monitoring additional mobile identification numbers ("MINs", hereafter) assigned to it by a server. The server operates in conjunction with a cellular network and assigns secondary MINs to the HBCD terminal from a pool of secondary MINs that it maintains for such assignment. The invention increases the data bandwidth of an existing cellular data network without costly hardware changes to base stations or cell sites.

Figure 1:
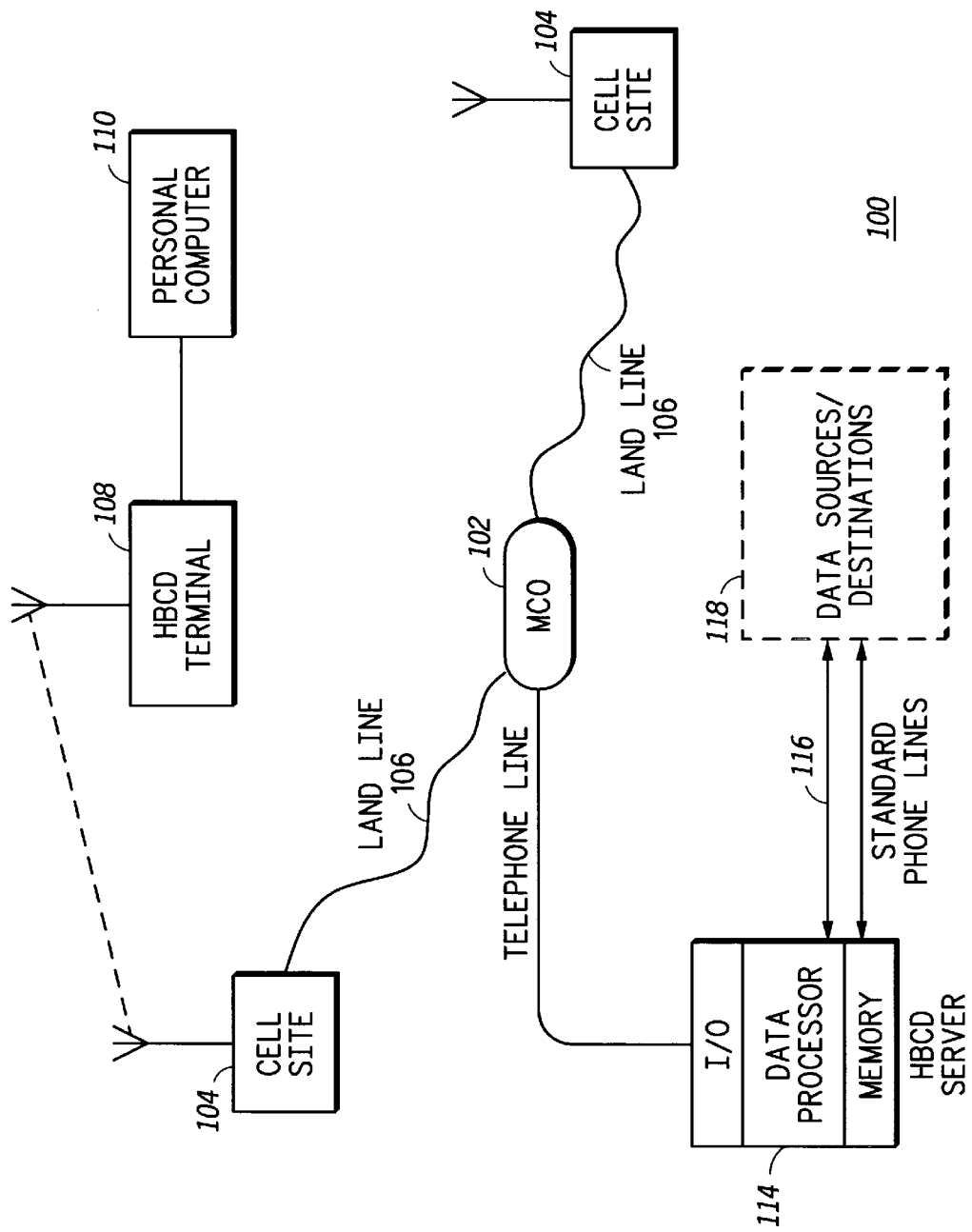
FIG. 1 depicts a block diagram of a cellular data network constructed in accordance with the present invention.

FIG. 1 depicts a block diagram of a cellular data network 100 constructed in accordance with the present invention. The cellular data network 100 consists of a mobile central office (MCO hereafter) 102, a plurality of cell sites (base stations) 104, and an HBCD terminal 108 connected to a personal computer 110. Also, the block diagram of FIG. 1 contains an HBCD server 114, various data sources and destinations 118, and a plurality of standard phone lines 116. MCO 102 is connected to cell sites 104 via land lines 106. MCO 102 is also connected to the HBCD server via a telephone line and to the land telephone system, or central office (not shown). The HBCD server 114 may be connected to various data sources and destinations 118 via standard telephone lines 116. It should be noted that the various land lines and telephone lines may be individually replaced with a wide range of multi-purpose or dedicated communications links, including wireline, fiber optic, and microwave relay.

HBCD server 114 itself consists of a data processor and a memory system connected to MCO 102 and to the various data sources and destinations 118 through an input/output ("I/O") interface. As described below, HBCD server 114 maintains a list of secondary MINs which it has obtained from the owner/operator of MCO 102. For instance, MCO 102 may reserve one thousand MINs having the form (512)933-7XYZ, where X, Y, and Z are variables for HBCD server 114. MCO 102 will not assign these numbers to cellular subscribers (nor will the local telephone company assign them to hardwired subscribers). HBCD server 114 can therefore initiate calls using any of these secondary MINs.

In operation, MCO 102 establishes individual cellular voice channels to HBCD terminal 108 through radio frequency transmissions. The transmissions may be initiated by HBCD terminal 108, by a telephone connected to MCO 102 through the public telephone network, or by various data sources and destinations 118 connected to MCO 102 through HBCD server 114. MCO 102, in conjunction with its cell sites 104, determines which cell site 104 is closest to HBCD terminal 108. MCO 102 then establishes the data link between the closest cell site 104 and HBCD terminal 108. MCO 102 may dynamically break this connection as the HBCD terminal 108 moves away from the closest cell site 104. In this case, MCO 102 would establish a second parallel transmission between the HBCD terminal 108 and the new closest cell site 104 before terminating the original connection, thereby passing the data link from one cell site to the next without interruption. As described below, each transmission between MCO 102 and HBCD terminal 108 may consist of voice data or digital data modulated for transmission on the analog carrier signal. Consequently, a personal computer 110 may be connected to HBCD terminal 108 to manipulate the received digital data for useful work. Any such voice or digital data transmitted on any one or more cellular channels connected to HBCD terminal 108 may be passed from a connection through the closest cell site to the new closest cell site without disruption to the registration and operation procedures of the terminal and server described below.

For many applications, cellular transmissions of digital data require more data bandwidth than is provided by a single cellular voice channel. If a cellular subscriber's application requires more bandwidth, then HBCD server 114 transmits secondary MINs to the subscriber's HBCD terminal 108 via an initial channel data link connected through the telephone line, MCO 102, land line 106, and cell site 104. Once HBCD terminal 108 receives the secondary MINs, it begins monitoring and responding to transmissions associated with the secondary MINs. This "paging" process is described below in connection with FIG. 2. Similarly, HBCD terminal 108 may initiate calls to HBCD server 114 by identifying itself to MCO 102 as one of the secondary MINs. This allows for increased data bandwidth by allowing transmissions on both the initial channel link and one or more secondary channels established by calls on the secondary MINs. When not needed by HBCD terminal 108, HBCD server 114 can reassign these secondary MINs to any other HBCD terminal (subscriber) in its coverage area. The HBCD server 114 and the HBCD terminal 108 can be simultaneously connected via more than one voice channel. The operation of HBCD terminal 108 is further described below in connection with FIGS. 6 and 7. The operation of HBCD server 114 is further described below in connection with FIGS. 8 and 9.

Figure 2:
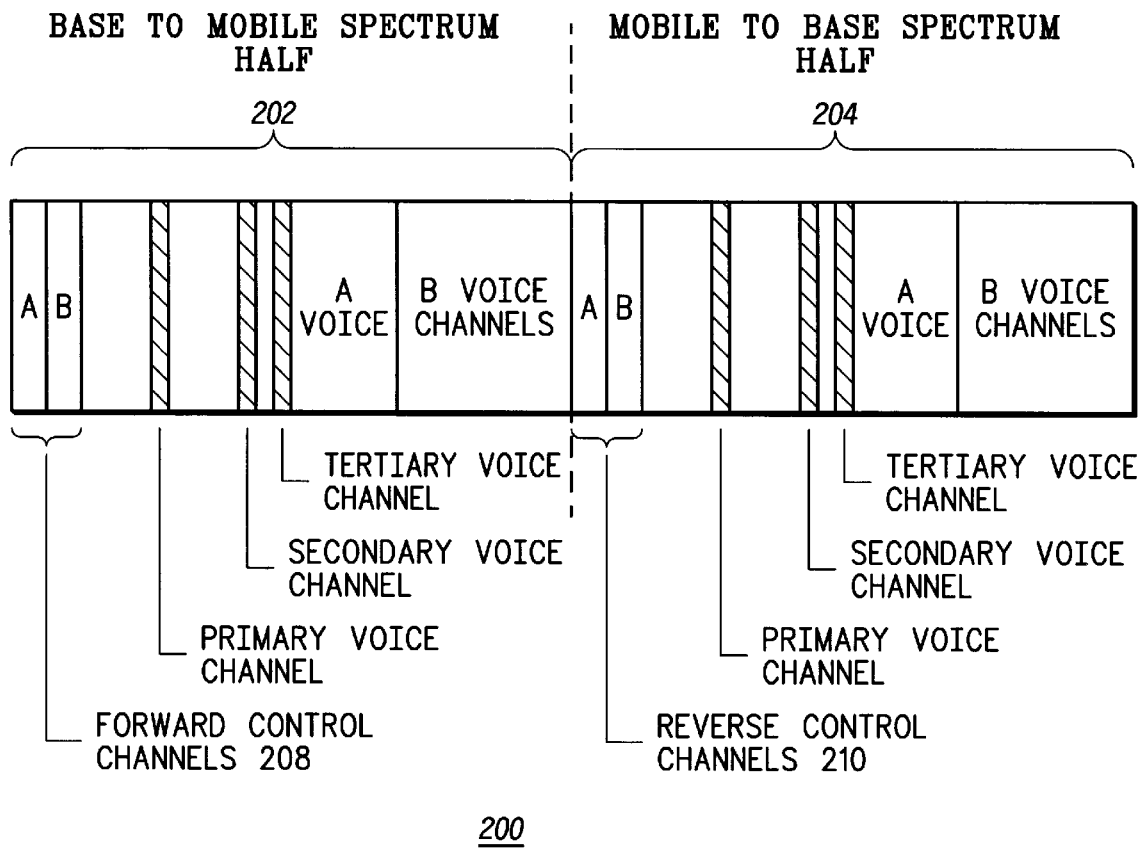
FIG. 2 depicts a frequency spectrum for base-to-mobile communications and for mobile-to-base cellular communications.

FIG. 2 depicts a frequency spectrum 200 for base-to-mobile communications and for mobile-to-base cellular. In the United States, radio spectrum between 800 MHz and 900 MHz is reserved for analog cellular communications for two service providers in each city. This spectrum is split into halves to support full duplex communication between base station and terminal and into quarters to support the two separate service providers (A and B, hereafter). A portion of the frequency range in this domain is allocated for control signals and a second portion is allocated for voice channels. The base-to-mobile spectrum half 202 illustrates the channels reserved for receiving information from the base or base station at the mobile terminal. The mobile-to-base spectrum half 204 illustrates channels reserved for transmitting information from the terminal to the base station.

Certain base-to-mobile channels are known as forward control channels 208. Similarly, certain mobile-to-base channels are known as reverse control channels 210. These channels are reserved for cellular system signaling purposes, including processes called registration and paging.

During registration, a cellular terminal identifies itself to the MCO 102. The cellular terminal uses a reverse control channel 210 to contact the nearest cell site 104. In this manner, MCO 102 will know which mobile subscribers are in its coverage area at any given time. MCO 102 will relay this information to the cellular subscriber's home service provider so that the home service provider can forward incoming calls to the subscriber wherever he or she is.

During a page, a base station transmits the primary MIN of a terminal it desires to contact. A terminal's primary MIN is, conceptually, its unique ten digit telephone number (USA). The terminal continuously monitors this channel(s). The terminal signals its presence to the base station on a reverse control channel 210 when it detects its own primary MIN on a forward control channel 208. Then, the base station assigns to the terminal a voice channel in the base-to-mobile spectrum half 202 and a voice channel in the mobile-to-base spectrum half 204. A duplex data link is established using the two assigned channels. Conversely, the terminal itself may initiate a call to the base by requesting a pair of voice channels via a reverse control channel 210.

The use of secondary MINs and other voice channels is described below. According to the present invention, the cellular data network assigns unused or secondary MINs to terminals as the terminals need bandwidth. These additional voice channels are illustrated as secondary voice channels and tertiary voice channels. It should be understood that the primary, secondary, and tertiary channels are equivalent except in time and frequency. Specifically, a particular channel is referred to as "tertiary" because it was the third channel established between HBCD terminal 108 and HBCD server 114. These channels are assigned by assigning unused MINs to the terminal. Then, the base station may page the terminal using one of the secondary MINs, or vice versa. It should be understood that a server, through a base station, assigns a primary channel or a secondary channel to a terminal by associating a particular frequency at the base station to the primary or secondary MIN. These associations change as the terminal moves from one cell site area to another cell site area.

Figure 3:
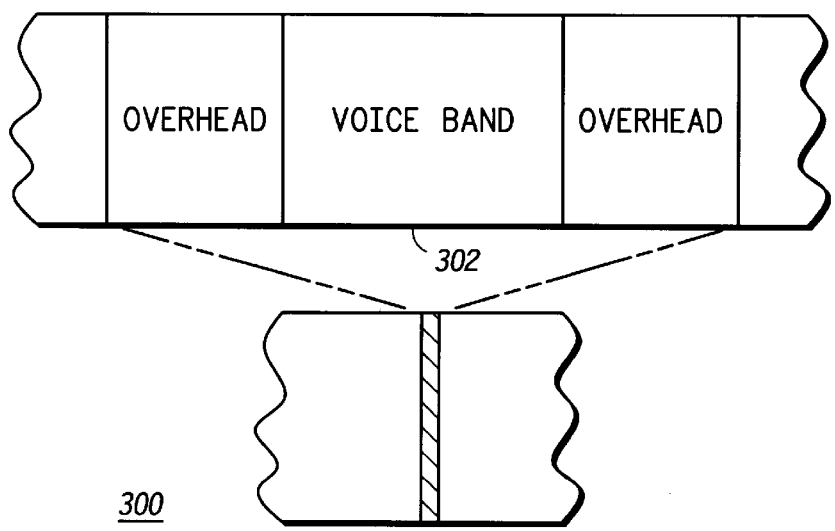
FIG. 3 depicts a frequency spectrum of a voice channel illustrated in FIG. 2.

FIG. 3 depicts the frequency spectrum 300 of a voice channel illustrated in FIG. 2. The voice channel contains a voice band 302, in addition to overhead. Existing analog cellular standards require that certain bandwidths be reserved for maintaining the cellular link. For instance, a portion of each voice channel is dedicated to transmitting a pilot signal by the base station and retransmission of the pilot signal by the terminal. The base station can then monitor how strong the terminal's signal is with respect to other base stations in the vicinity of the terminal. If one of these other base stations more strongly receives the signal, then the data link can be switched to the other base station and the terminal.

According to one aspect of the disclosed invention, a signaling protocol is used to transmit control information between HBCD terminal 108 and HBCD server 114. The control information is used to assign secondary MINs to HBCD terminal 108 transparent to MCO 102 and cell site 104. The control information is transmitted between HBCD terminal 108 and HBCD server 114 via the voice band portion 302 of a voice channel. The transparent assignment of additional bandwidth permits the continued use of standard cell site equipment. Equipment upgrades are not required. The signaling protocol is described below in connection with FIG. 4.

Figure 4:
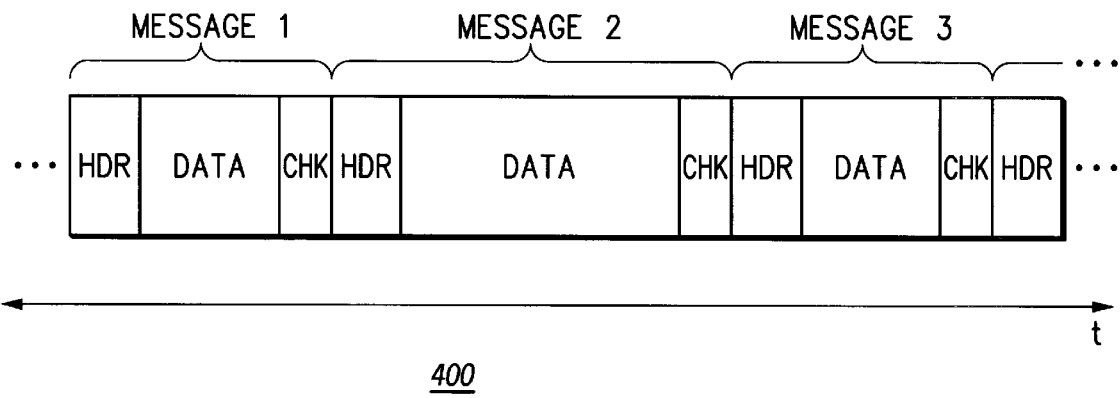
FIG. 4 depicts a data services signaling protocol (DSSP) in the time domain.

FIG. 4 depicts a data services signaling protocol (hereafter DSSP) in the time domain. The DSSP is used for communications between HBCD terminal 108 and HBCD server 114, in accordance with a preferred embodiment of the present invention. In FIG. 4, three messages are illustrated being transmitted to/from HBCD terminal 108 via voice band 302. Each of these messages is transmitted in the voice band portion of a voice channel illustrated in FIGS. 2 and 3. Starting with message one, three distinct regions are identified: a header (HDR), a data message (DATA), and a check signal (CHK). Messages two and three contain the same three parts. However, it should be understood that the three messages may or may not contain unique data. The HDR portion of each message indicates if the immediately following DATA portion is to be treated as data or as control information by HBCD terminal 108. If the DATA portion is to be treated as data, then it is routed to personal computer 110. If the DATA portion is to be treated as control information, then it is routed to the various control devices in HBCD terminal 108 or HBCD server 114, as the case may be. The check signal is used to verify that a received message has not been corrupted during transmission. Typically, it is an encoding of the number of high, or low, logic bits in the preceding bit stream or a checksum.

For instance, HBCD server 114 may assign a secondary MIN to HBCD terminal 108 using the DSSP. In this case, a voice channel is initially established between HBCD terminal 108 and cell site 104 using the primary MIN assigned to HBCD terminal 108. This initial voice channel may be established at the insistence of HBCD terminal 108 or HBCD server 114. In either case, HBCD server 114 includes a bit pattern in the HDR portion of a message indicating that the DATA portion is control information. Next, HBCD server 114 transmits the secondary MIN to HBCD terminal 108 in the DATA portion of the message. HBCD terminal 108 will receive this new secondary MIN, store it in its onboard memory (FIG. 5), and begin monitoring the forward control channels for the secondary MIN. In a similar manner, additional secondary MINs can be assigned to HBCD terminal 108 using the same voice channel or another voice channel established using an assigned secondary MIN.

A secondary MIN can be assigned to HBCD terminal 108 at the insistence of HBCD terminal 108 or at the insistence of HBCD server 114. If these secondary MINs are assigned to HBCD terminal 108 at the insistence of HBCD terminal 108, then the DSSP message described above, would be preceded by a DSSP message from HBCD terminal 108 to HBCD server 114 requesting the assignment of a secondary MIN. This strategy allows actual bandwidth to mirror the demanded bandwidth, whether the demand is from HBCD terminal 108 or from HBCD server 114. After HBCD terminal 108 has its list of assigned secondary MINs, then it can receive calls or initiate calls as its bandwidth dictates or as the bandwidth requirements of the various data sources and destinations 118 dictate. In a similar manner, calls can be terminated when the additional bandwidth is no longer needed.

Conversely, additional secondary MINs can be assigned to HBCD terminal 108 using voice channels established using the first secondary MIN. This second strategy may be useful if it is desirable to assign additional secondary MINs only as additional bandwidth is required. In one embodiment of the disclosed invention, the primary MIN is only used to request secondary MINs. Therefore, it is a secondary MIN that is active while data is actually transferred between HBCD terminal 108 and HBCD server 114.

Figure 5:
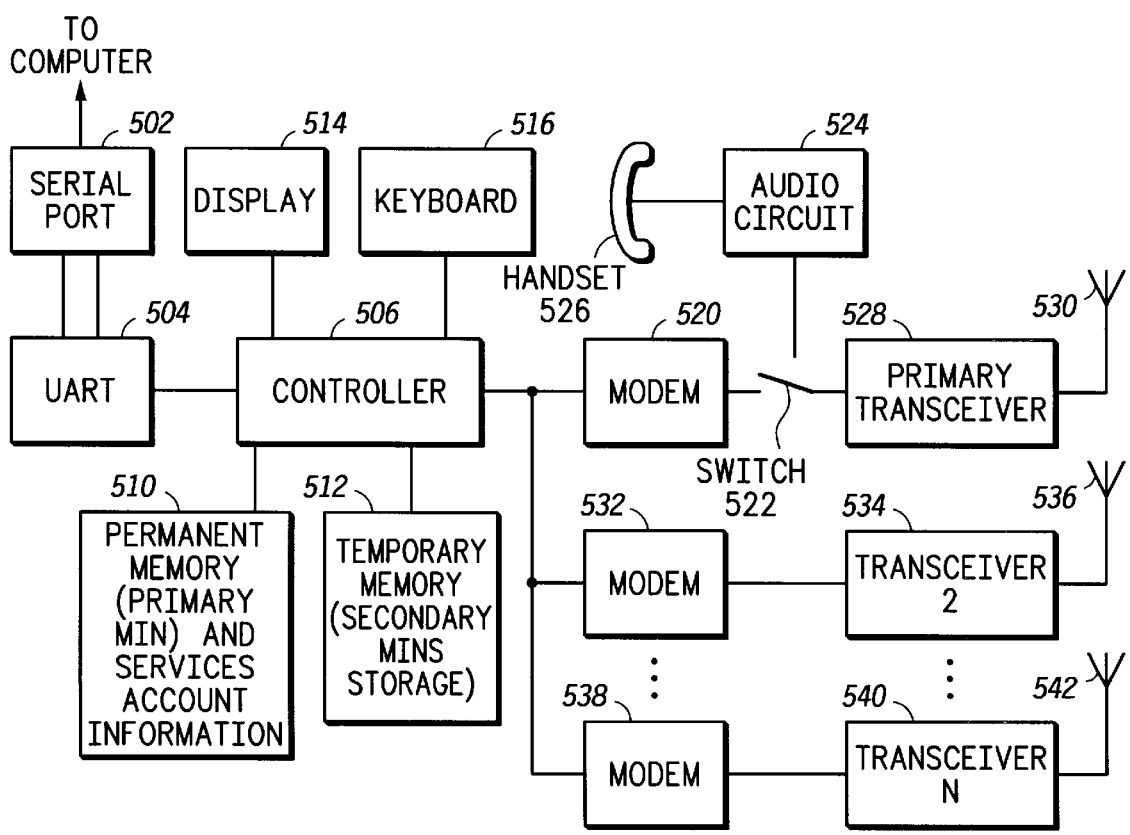
FIG. 5 depicts an embodiment of a high bandwidth cellular data terminal illustrated in FIG. 1.

FIG. 5 depicts an embodiment of HBCD terminal 108 illustrated in FIG. 1, hereafter HBCD terminal 500. HBCD terminal 500 includes a link to a personal computer via a serial port 502. Serial port 502 receives and transmits information to a universal asynchronous receiver and transmitter (UART, hereafter) 504. UART 504 receives and transmits information with a general purpose controller 506. Controller 506 may be a special purpose microcontroller or a general purpose data processor.

Controller 506 accesses primary MIN information and HBCD services account information from a permanent memory 510. Memory 510 may also store program instructions for the operation of controller 506 and other software routines, such as network browsers, etc. used to manipulate received data. Controller 506 accesses various secondary MINs from the temporary memory 512. As described above, these secondary MINs are temporarily assigned to HBCD terminal 500 by HBCD server 114. The permanent memory 510 and the temporary memory 512 can consist of a wide variety of volatile and non-volatile memories, including but not limited to electrically erasable programmable read only memory or "flash memory" (EEPROM), electrically programmable read only memory (EPROM), static random access memory (SRAM), dynamic random access memory (DRAM), and synchronous dynamic random access memory (SDRAM). Controller 506 also receives and transmits data to a user display 514 and to a keyboard 516.

A plurality of modems are also connected to the controller 506. Each one of these modems can be programmed by controller 506 to simultaneously operate on a separate voice channel. This simultaneous operation increases the bandwidth of HBCD terminal 500.

Starting with a first modem 520, controller 506 exchanges information with a primary transceiver 528. Primary transceiver 528 transmits and receives information via an antenna 530. Also, primary transceiver 528 communicates with an audio circuit 524 via a switch 522. Switch 522 is capable of rerouting information from primary transceiver 528 to an audio circuit 524 and, ultimately, to a handset 526. This design facilitates audio communications. Switch 522 may be controlled by controller 506 and/or by a user switch. The plurality of modems and transceivers continues with a second modem 532 coupled to controller 506 and to a second transceiver 534. Second transceiver 534 is coupled to a second antenna 536. The plurality of modems continues to an Nth modem 538 coupled to controller 506 and to an Nth transceiver 540. Nth transceiver 540 is coupled to an Nth antenna 542.

In the current embodiment, there is a modem and transceiver for each channel supported by the HBCD terminal. In another embodiment, a single transceiver may be used. Such a transceiver would be able to frequency multiplex two or more transmissions into a single transmission. In another embodiment, the modem and corresponding transceiver may be integrated into a single unit.

HBCD terminal 500 has various uses. In one application, a user may receive information from and transmit information to a site on the World Wide Web. Such an application may require large bandwidth to transmit large video and audio files. In another application, handset 526 and audio circuit 524 may be used to place a cellular telephone call.

In the World Wide Web application, browser software may be loaded into permanent memory 510, into temporary memory 512, or into an external computer connected via serial port 502. The external computer or controller 506 executes the stored program with controller 506 simultaneously controlling the transfer of data to and from modems 520, 532, and 538. The browser software may receive control inputs from the external computer, from keyboard 516, or from handset 526.

If more or less bandwidth is required, then controller 506 can request or release secondary MINs from HBCD server 114. Or, HBCD server 114 can assign or release secondary MINs to HBCD terminal 500. After receiving secondary MINs, controller 506 will monitor the forward control channels for pages, and, upon receipt of a page, will direct its transceivers to monitor the new voice channels established by the pages. Conversely, controller 506 will initiate calls on its transceivers 528, 534, and 540 using the additional secondary MINs. These processes are more fully described below in connection with FIGS. 6 through 8.

Figure 6:
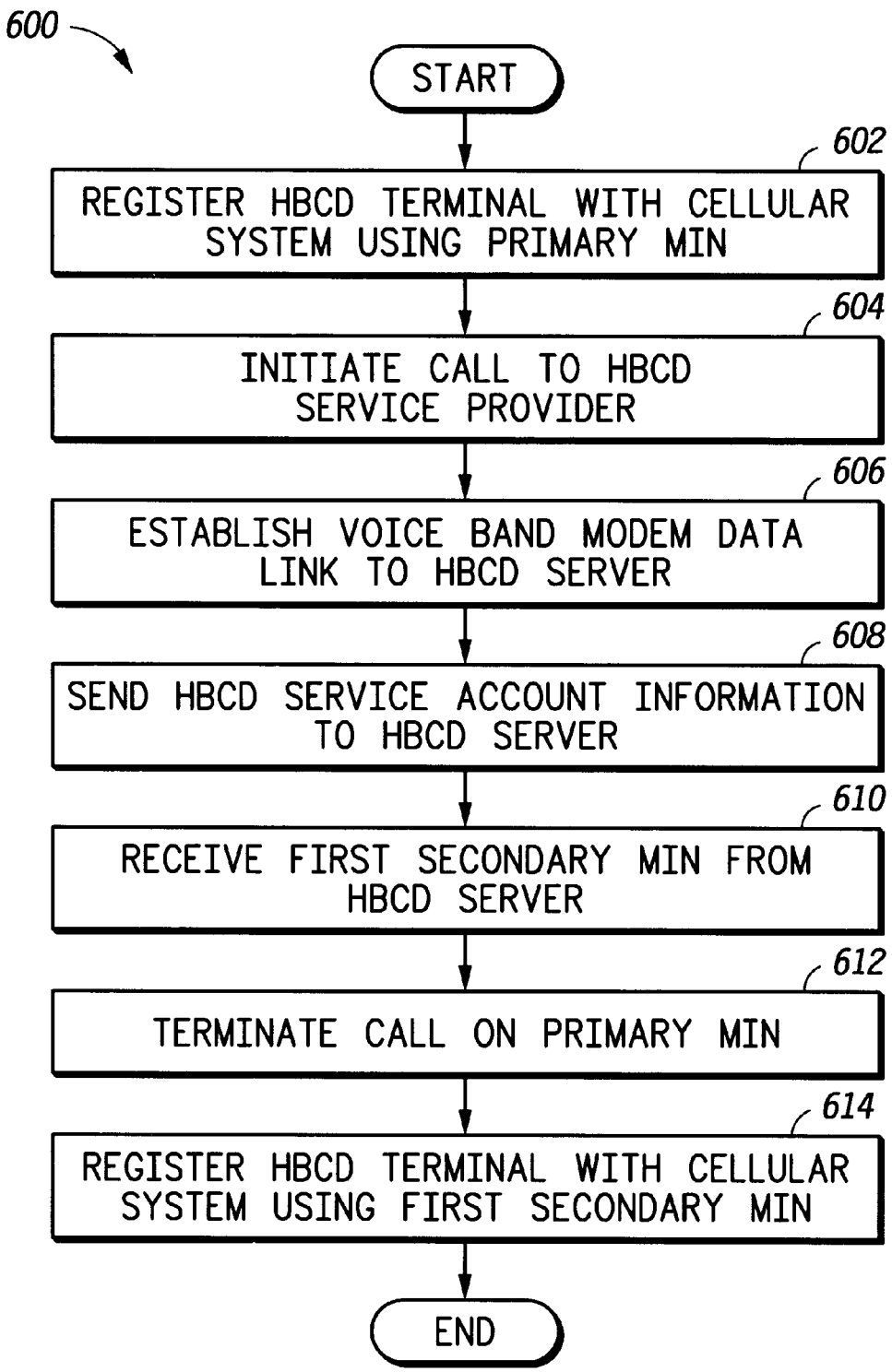
FIG. 6 depicts a process flow chart for a terminal registration procedure in accordance with the present invention.

FIG. 6 depicts a process flow chart 600 for a terminal registration procedure in accordance with the present invention. By this procedure, HBCD terminal 500 is assigned secondary MINs by HBCD server 114. Starting with a step 602, HBCD terminal 500 registers itself with a cellular system using its primary MIN. HBCD terminal 500 registers itself by transmitting its primary MIN to the cellular network over a reverse control channel. This process allows the cellular network to know that a particular HBCD terminal is in its coverage area. Proceeding to a step 604, HBCD terminal 500 initiates a call to the HBCD service provider. In a step 606, HBCD server 114 establishes a voice band modem data link to HBCD terminal 500. Proceeding to a step 608, HBCD terminal 500 sends its HBCD service account information to HBCD servicer 114. In a step 610, HBCD terminal 500 receives a first secondary MIN from HBCD server 114. In other embodiments, HBCD server 114 may assign additional secondary MINs to HBCD terminal 500 in step 610. In a step 612, the HBCD terminal 500 terminates the initial call based on the primary MIN. In a final step 614, HBCD terminal 500 registers its secondary MIN with the cellular system. HBCD terminal 500 registers its primary and secondary MINs with the cellular system because it may move from cell site 104 to cell site 104. Therefore, the cellular system can know where the HBCD terminal 500 is and is not.

Figure 7:
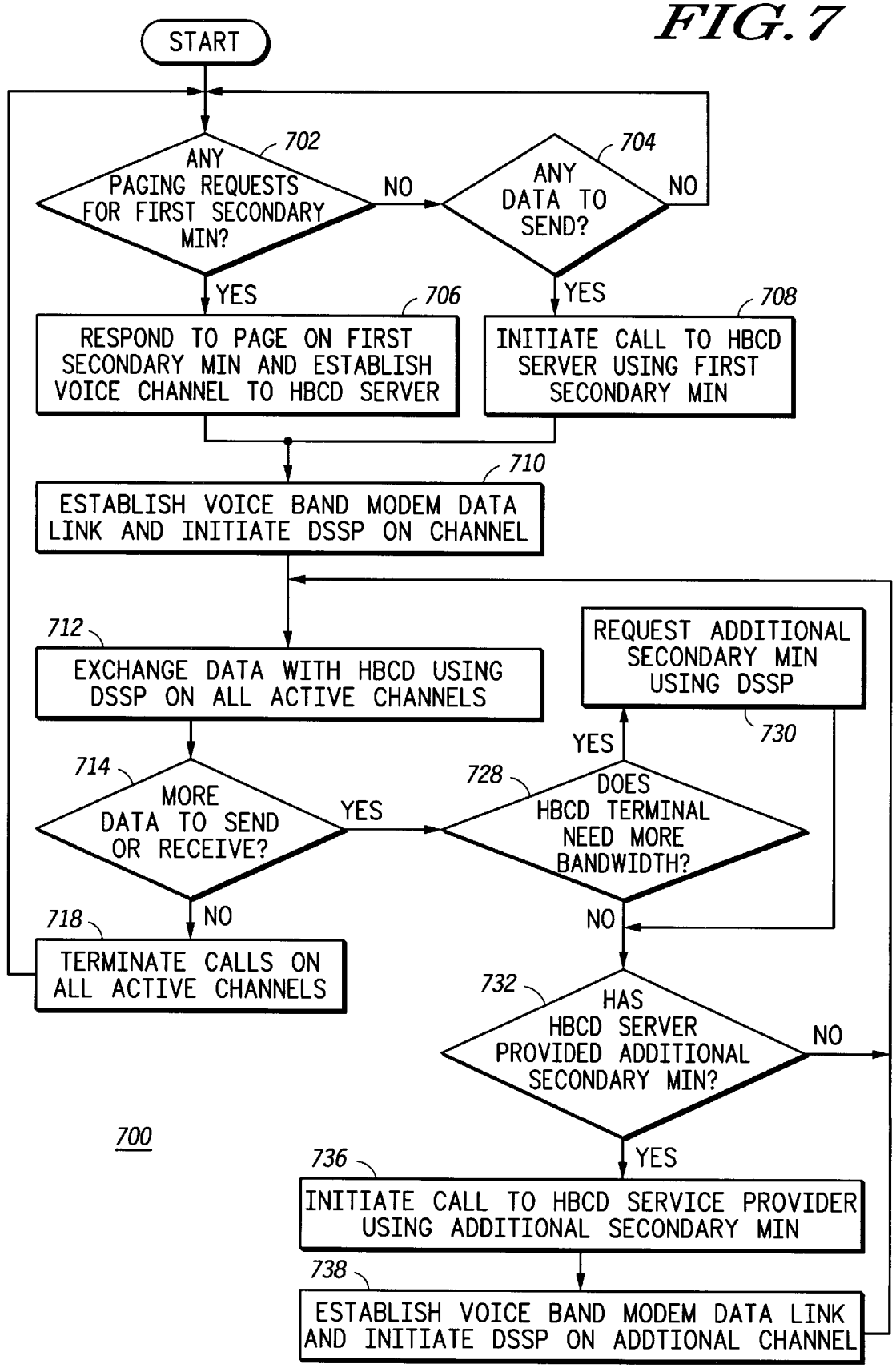
FIG. 7 depicts a process flow chart for a terminal operation procedure in accordance with the present invention.

FIG. 7 depicts a process flow chart 700 for a terminal operation procedure in accordance with the present invention. By this procedure, HBCD terminal 500 transmits data to and receives data from HBCD server 114. Starting with a step 702, HBCD terminal 500 determines if it has received any paging requests for a first secondary MIN. If the decision is false, then HBCD terminal 500 determines if it has any data to be sent, a step 704. If this decision is also false, then HBCD terminal 500 returns to step 702.

If the decision in step 702 is true (a page exists), then HBCD terminal 500 responds to the page on a reverse control channel 210, HBCD terminal 500 and HBCD server 114 also establish a voice channel, a step 706. Returning to step 704, if HBCD terminal 500 did have data to send to HBCD server 114, then HBCD terminal 500 initiates a call to HBCD server 114 using the first secondary MIN, a step 708. Both steps 706 and 708 proceed to a step 710. Therein, HBCD terminal 500 and the cellular system establish a voice band modem data link and initiate a DSSP on the channel, a step 710.

Proceeding to a step 712, HBCD terminal 500 and HBCD server 114 exchange data on all active channels. Next, HBCD terminal 500 determines if it has more data to be sent or to be received, a step 714. If HBCD terminal 500 determines that it has no more data, then it terminates the calls on all of the active channels, a step 718. HBCD terminal 500 returns to step 702. If HBCD terminal 500 determines that it has more data in step 714, then it determines if it needs more bandwidth, a step 728. If HBCD terminal 500 determines that it needs more bandwidth, then it requests an additional secondary MIN using the DSSP, a step 730.

If HBCD terminal 500 determines that it does not need more bandwidth and after step 730 in all cases, then HBCD terminal 500 determines if it has been assigned additional secondary MINs by HBCD server 114 in a previous transmission, a step 732. If HBCD terminal 500 determines that it has not been assigned additional secondary MINs, then HBCD terminal 500 returns to step 712. If HBCD terminal 500 determines that it has been assigned additional secondary MINs, then it initiates a call to the HBCD service provider using the additional secondary MIN, a step 736. Next, HBCD terminal 500 establishes a voice band modem data link and initiates the DSSP on the additional channel, a step 738. The process continues, returning to step 712.

Figure 8:
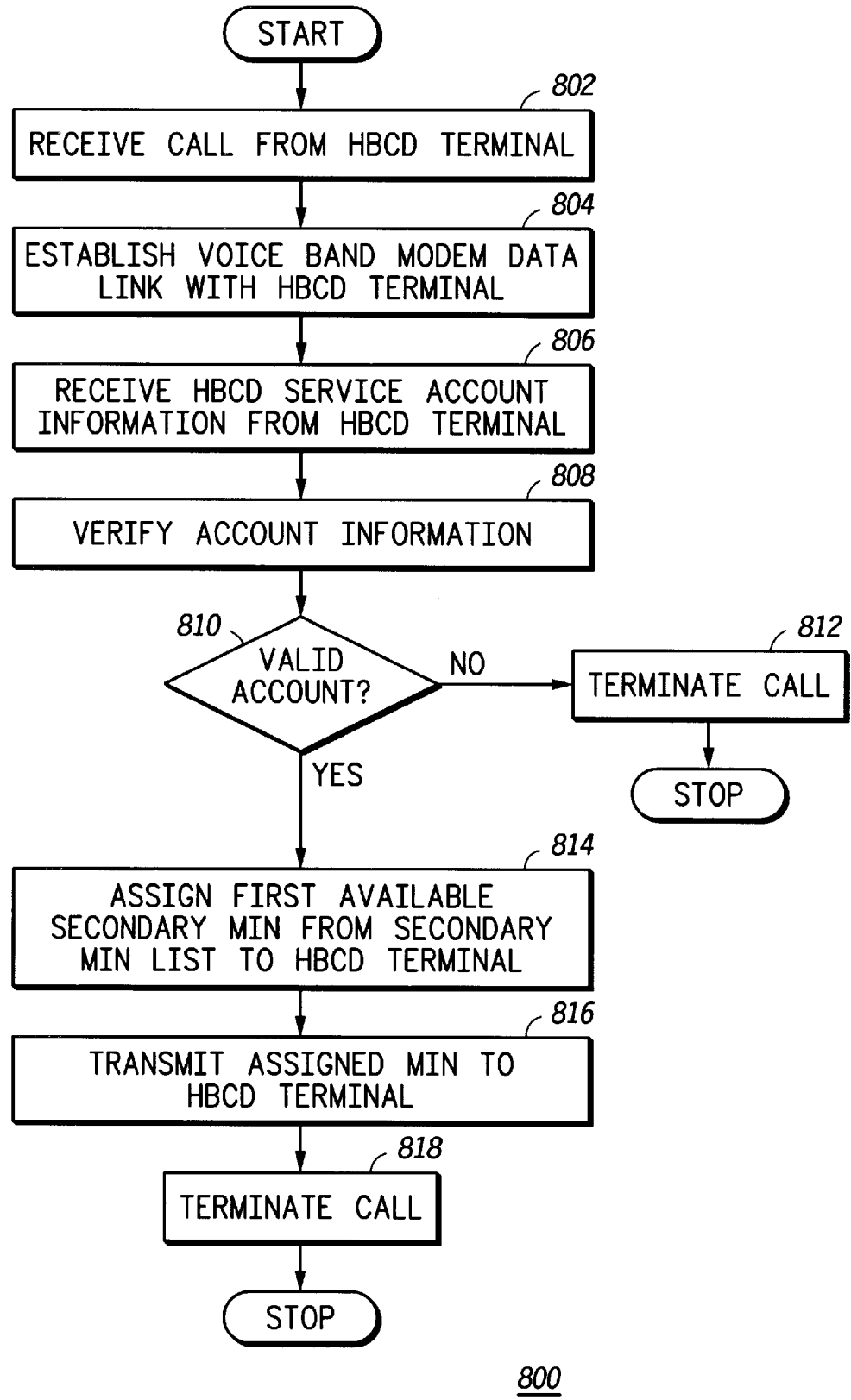
FIG. 8 depicts a process flow chart for a server registration procedure in accordance with the present invention.

FIG. 8 depicts a process flow chart 800 for a server registration procedure in accordance with the present invention. By this procedure, HBCD server 114 assigns secondary MINs to HBCD terminal 500. Starting with a step 802, HBCD server 114 receives a call from HBCD terminal 500. In a step 804, HBCD server 114 establishes a voice band modem data link with the HBCD terminal 500. Next, HBCD server 114 receives HBCD service account information from the HBCD terminal 500, a step 806. HBCD server 114 verifies this information against its records, a step 808. If the account information is not correct, a step 810, then HBCD server 114 terminates the call, a step 812, and ends the flow chart. If the account information is correct, then HBCD server 114 continues to a step 814. In step 814, HBCD server 114 assigns the first available secondary MIN from its secondary MIN list to HBCD terminal 500. HBCD server 114 transmits this secondary MIN to HBCD terminal 500, a step 816. Finally, HBCD server 114 terminates the initial call, a step 818. In other embodiments, HBCD server 114 may assign additional secondary MINs to HBCD terminal 500 in steps 814 and 816.

Figure 9:
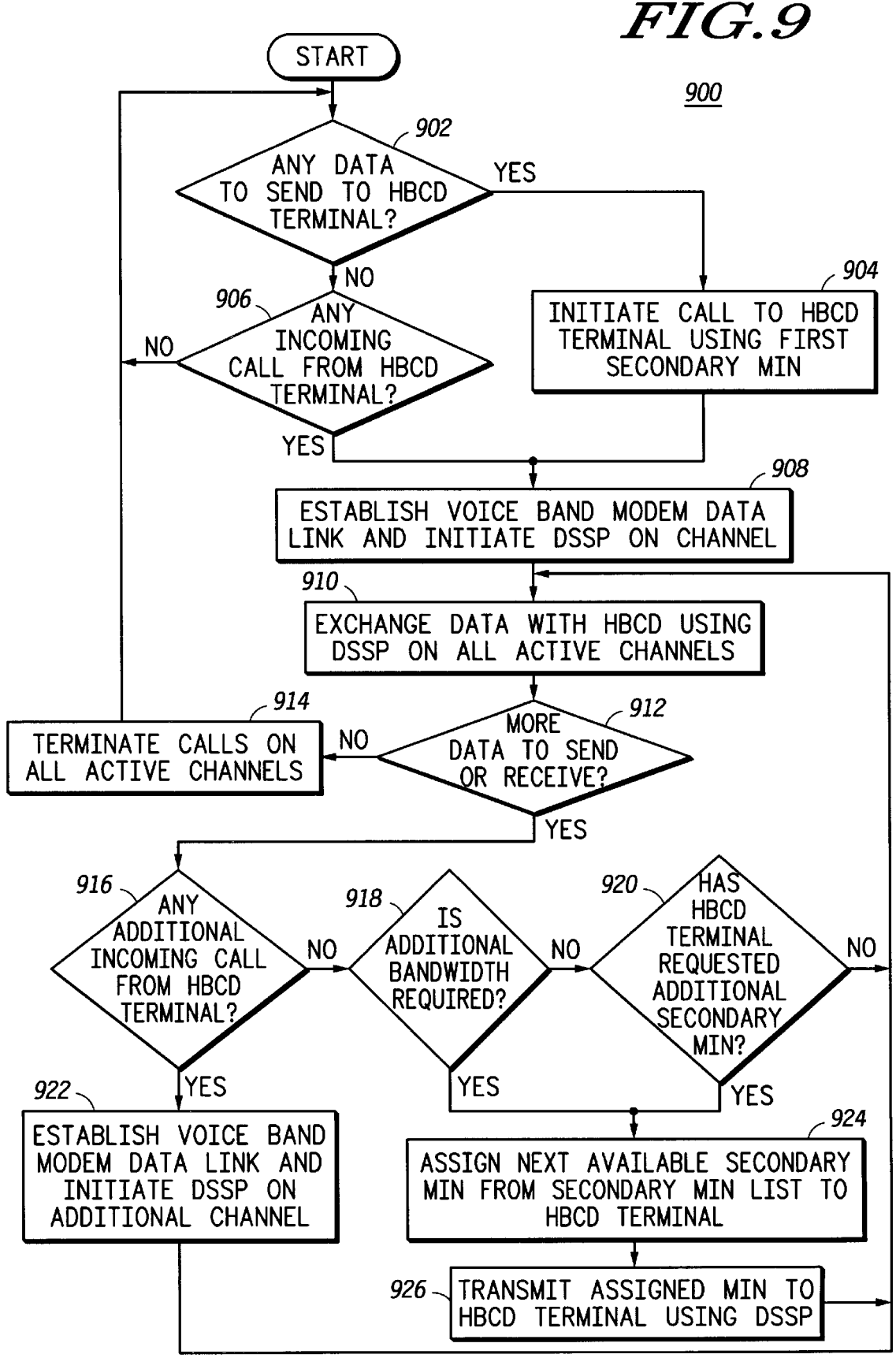
FIG. 9 depicts a process flow chart for a server operation procedure in accordance with the present invention.

FIG. 9 depicts a process flow chart 900 for a server operation procedure in accordance with the present invention. By this procedure, HBCD server 114 transmits data to and receives data from HBCD terminal 500. Starting with a step 902, HBCD server 114 determines if it has any data to send to HBCD terminal 500. If HBCD server 114 has data to send, then it pages HBCD terminal 500 using a first secondary MIN, a step 904. If HBCD server 114 does not have data to send, then it determines if there are any incoming calls from HBCD terminal 500, a step 906. If there are no incoming calls, then HBCD server 114 returns to step 902. If there is an incoming call from HBCD terminal 500 and after step 904 in any case, then HBCD server 114 establishes a voice band modem data link with HBCD terminal 500, a step 908. HBCD server 114 uses the DSSP to exchange control and data information with HBCD terminal 500, a step 910.

After exchanging data in step 910, HBCD server 114 determines if it has any more data to send to or receive from HBCD terminal 500, a step 912. If HBCD server 114 does not have any more data, then it terminates calls on all active channels with HBCD terminal 500, a step 914. HBCD server 114 returns to step 902.

If HBCD server 114 has more data, then it determines if there are other incoming calls from the same HBCD terminal 500, a step 916. If there are no more incoming calls, then HBCD server 114 determines if there is any additional bandwidth required to transmit the remaining data from step 912, a step 918. If HBCD server 114 does not require additional bandwidth, then HBCD server 114 determines if HBCD terminal 500 requested additional secondary MINs, a step 920. If HBCD terminal 500 did not request additional secondary MINs, then HBCD server 114 returns to step 910, where it transmits further data.

Returning to steps 918 and 920, if HBCD server 114 determined that additional bandwidth is required to transmit the remaining data or if HBCD terminal 500 requested additional secondary MINs, then HBCD server 114 assigns an additional secondary MIN to HBCD terminal 500, a step 924. Next, HBCD server 114 transmit the assigned secondary MIN to HBCD terminal 500 using the DSSP, a step 926. HBCD server returns to step 910, where it transmits further data on the active channels.

Returning to step 916, if HBCD server 114 determined that there are other incoming calls from the same HBCD terminal 500, then establishes another voice band modem data link with HBCD terminal 500, a step 922. HBCD server also initiates DSSP on the additional channel. HBCD server returns to step 910, where it transmits the remaining data on the active channels.

Although the present invention has been described with reference to a specific embodiment, further modifications and improvements will occur to those skilled in the art. It is to be understood therefore, that the invention encompasses all such modifications that do not depart from the spirit and scope of the invention as defined in the appended claims.

I claim:

1. A method of high bandwidth cellular data transmission, the method comprising:
    sending a control signal over a cellular network to activate a cellular channel on the cellular network connecting a terminal and a server;
    establishing a cellular channel voice band as a data link that uses a particular communication protocol on the cellular network, in response to the control signal to activate a cellular channel;
    transmitting data between the terminal and server over an established cellular channel voice band;
    sending a control signal to the server over the established cellular channel voice band to increase bandwidth of the data being transmitted over the established cellular channel voice band;
    establishing one or more additional cellular channel voice bands as separate data links that use the communication protocol on the cellular network, in response to the control signal to increase bandwidth; and
    simultaneously transmitting data between the terminal and server over an established cellular channel voice band and established one or more additional cellular channel voice bands.

2. A method of high bandwidth cellular data transmission according to claim 1, wherein at least one of the steps of sending a control signal includes sending a control signal from a device electrically connected to the terminal.

3. A method of high bandwidth cellular data transmission according to claim 1, wherein at least one the steps of sending a control signal includes sending a control signal via the cellular network from the server.

4. A method of high bandwidth cellular data transmission according to claim 1, wherein one or more secondary mobile identification numbers (MINs) are allocated by the server to the terminal from a plurality of MINs, and the one or more secondary MINs are assigned to at least one of the cellular channel voice band and the additional cellular channel voice bands, and wherein the step of establishing a cellular channel voice band as a data link includes establishing the data link on a cellular channel voice band assigned a first secondary MIN of the one or more secondary MINs.

5. A method of high bandwidth cellular data transmission according to claim 4, wherein the step of establishing a cellular channel voice band as a data link includes requesting the data link on a cellular channel voice band assigned a first secondary MIN of the one or more secondary MINs.

6. A method of high bandwidth cellular data transmission according to claim 5, wherein the one or more secondary MINs are local MINs to a service area associated with a current location of the terminal.

7. A method of high bandwidth cellular data transmission according to claim 4, wherein the step of establishing a cellular channel voice band as a data link includes establishing the data link on a cellular channel voice band assigned a first secondary MIN of the one or more secondary MINs.

8. A method of high bandwidth cellular data transmission according to claim 4, wherein the step of establishing one or more additional cellular channel voice bands as data links includes establishing the data links on additional cellular channel voice bands assigned the one or more secondary MINs.

9. A method of high bandwidth cellular data transmission according to claim 1, further comprising the steps of:
    dynamically allocating one or more secondary mobile identification numbers (MINs) to the terminal from a plurality of MINs maintained by the server; and
    assigning the one or more secondary MINs to at least one of the cellular channel voice band and the additional cellular channel voice bands.

10. A method of high bandwidth cellular data transmission according to claim 1, further comprising the steps of:
    registering the terminal with the cellular network over a cellular channel associated with a primary mobile identification number (MIN);
    initiating a cellular telephone link with the server using the primary MIN;
    establishing a data link on a cellular channel voice band associated with the primary MIN; and
    receiving at least a first secondary MIN at the terminal from the server via the data link.

11. A method of high bandwidth cellular data transmission according to claim 10, further comprising the step of transmitting service account information to the server via the data link.

12. A method of high bandwidth cellular data transmission according to claim 10, further comprising the step of transmitting a plurality of secondary MINs to the terminal via the data link.

13. A method of high bandwidth cellular data transmission according to claim 10, further comprising the step of registering the terminal with the cellular network over a cellular channel associated with the first secondary MIN.

14. A method of high bandwidth cellular data transmission, the method comprising:
    receiving a request to exchange data between a terminal and a server, via a cellular network;
    establishing a cellular channel voice band as a data link that uses a particular communication protocol on the cellular network, in response to receiving the request to exchange data;

transmitting data between the terminal and server over an established cellular channel voice band;

receiving a request to increase bandwidth of the data being transmitted over the established cellular channel voice band;

establishing one or more additional cellular channel voice bands as separate data links that uses the communication protocol on the cellular network, in response to the request to increase bandwidth; and simultaneously transmitting data between the terminal and server over an established cellular channel voice band and established one or more additional cellular channel voice bands.

15. A method of high bandwidth cellular data transmission according to claim 14, wherein the steps of receiving a request include receiving a request from a device connected to the terminal.

16. A method of high bandwidth cellular data transmission according to claim 14, wherein the step of receiving a request includes receiving a request via the cellular network from the server.

17. A method of high bandwidth cellular data transmission according to claim 14, further comprising the steps of:

dynamically allocating one or more secondary mobile identification numbers (MINs) to the terminal from a plurality of MINs maintained by the server; and assigning the one or more secondary MINs to at least one of the cellular channel voice band and the additional cellular channel voice bands.

18. A method of high bandwidth cellular data transmission according to claim 17, wherein the allocated secondary MINs are local MINs to a service area associated with a current location of the terminal.

19. A method of high bandwidth cellular data transmission according to claim 17, wherein the step of establishing a cellular channel voice band as a data link includes establishing the data link on a cellular channel voice band assigned a first secondary MIN of the one or more secondary MINs.

20. A method of high bandwidth cellular data transmission according to claim 17, wherein the step of establishing a cellular channel voice band as a data link includes establishing the data link on a cellular channel voice band assigned a first secondary MIN of the one or more secondary MINs.

21. A method of high bandwidth cellular data transmission according to claim 17, wherein the step of establishing one or more additional cellular channel voice bands as data links includes establishing the data links on additional cellular channel voice bands assigned the one or more secondary MINs.

22. A method of high bandwidth cellular data transmission according to claim 14, further comprising the steps of:

registering the terminal with the cellular network over a cellular channel associated with a primary mobile identification number (MIN);

initiating a cellular telephone link with the server using the primary MIN;

establishing a data link on a cellular channel voice band associated with the primary MIN; and receiving at least a first secondary MIN at the terminal from the server via the data link.

23. A method of high bandwidth cellular data transmission according to claim 22, further comprising the step of transmitting service account information to the server via the data link.

24. A method of high bandwidth cellular data transmission according to claim 22, further comprising the step of transmitting a plurality of secondary MINs to the terminal via the data link.

25. A method of high bandwidth cellular data transmission according to claim 22, further comprising the step of registering the terminal with the cellular network over a cellular channel associated with the first secondary MIN.

26. A high bandwidth cellular data terminal comprising:

a plurality of modems;

a plurality of transceivers suitable for transmitting data on a cellular network, each transceiver being connected with a modem of the plurality of modems;

a memory storing a primary mobile identification number (MIN) and one or more secondary MINs; and a controller connected to the memory and the plurality of modems that transmits and receives information via a modem of the plurality of modems on a voice band of a cellular channel associated with the primary MIN, and transmits and receives additional information, as required, via one or more modems of the plurality of modems on one or more voice bands of one or more cellular channels associated with the one or more secondary MINs, respectively.

27. A high bandwidth cellular data terminal according to claim 26, wherein the terminal further comprises an audio circuit that processes audio signals exchanged from the plurality of transceivers to provide telephony function.

28. A high bandwidth cellular data terminal according to claim 26, wherein the terminal further comprises a keyboard and display.

29. A high bandwidth cellular data terminal according to claim 26, wherein the terminal further comprises a peripheral connection to a peripheral device.

30. A high bandwidth cellular data terminal according to claim 29, wherein the peripheral device is a computer.

* * * * *